US012282990B2

(12) United States Patent
Liu

(10) Patent No.: US 12,282,990 B2
(45) Date of Patent: Apr. 22, 2025

(54) CONTACT INFORMATION PRESENTATION

(71) Applicant: Tencent Technology (Shenzhen) Company Limited, Guangdong (CN)

(72) Inventor: Yue Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 202 days.

(21) Appl. No.: 17/986,841

(22) Filed: Nov. 14, 2022

(65) Prior Publication Data
US 2023/0072463 A1   Mar. 9, 2023

Related U.S. Application Data

(63) Continuation of application No. PCT/CN2022/077244, filed on Feb. 22, 2022.

(30) Foreign Application Priority Data

Mar. 12, 2021   (CN) .......................... 202110269698.7

(51) Int. Cl.
*G06T 13/40*   (2011.01)
*A63F 13/53*   (2014.01)

(52) U.S. Cl.
CPC .............. *G06T 13/40* (2013.01); *A63F 13/53* (2014.09)

(58) Field of Classification Search
CPC .......... G06T 13/40; A63F 13/53; A63F 13/35; A63F 13/795; A63F 13/533; A63F 13/52; A63F 13/537; G06F 3/011; G06F 3/016; G06F 9/451
See application file for complete search history.

(56) References Cited

U.S. PATENT DOCUMENTS

| 8,814,698 | B1 | 8/2014 | Lee |
| 9,253,183 | B2 * | 2/2016 | Nathan ................... H04L 63/08 |
| 10,614,665 | B2 * | 4/2020 | Oberberger ......... G07F 17/3269 |

(Continued)

FOREIGN PATENT DOCUMENTS

| CN | 103475766 A | 12/2013 |
| CN | 105468275 A | 4/2016 |

(Continued)

OTHER PUBLICATIONS

International Search Report and Written Opinion in PCT/CN2022/077244, mailed on May 17, 2022, 9 pages.

(Continued)

*Primary Examiner* — Vijay Shankar
(74) *Attorney, Agent, or Firm* — ArentFox Schiff LLP

(57) ABSTRACT

Some aspects of the disclosure provide a method for contact information presentation. The method includes providing a contact interface for an application including a virtual scene, and presenting a front side of a contact card associated with a contact in the contact interface. The front side includes a virtual avatar of the contact in the virtual scene. The method further includes detecting a first operation on the front side of the contact card; and in response to the first operation, presenting a back side of the contact card in the contact interface. The back side includes at least one interaction control for an interaction with the contact. Apparatus and non-transitory computer-readable storage medium counterpart embodiments are also contemplated.

19 Claims, 9 Drawing Sheets

(56) References Cited

U.S. PATENT DOCUMENTS

| | | | |
|---|---|---|---|
| 10,963,816 B1* | 3/2021 | Publicover | G06Q 50/01 |
| 11,348,298 B2* | 5/2022 | Weston | A63F 13/655 |
| 11,899,835 B2* | 2/2024 | Stafford | G02B 27/017 |
| 2015/0143487 A1* | 5/2015 | Nathan | H04L 63/08 726/6 |
| 2017/0080346 A1* | 3/2017 | Abbas | A63F 13/79 |
| 2018/0329486 A1* | 11/2018 | Williams | G02B 27/017 |
| 2021/0216203 A1* | 7/2021 | Wu | H04M 1/72436 |

FOREIGN PATENT DOCUMENTS

| | | | |
|---|---|---|---|
| CN | 106886538 A | | 6/2017 |
| CN | 111462307 A | | 7/2020 |
| CN | 112891939 A | | 6/2021 |
| KR | 10-2007-0108417 A | | 11/2007 |
| KR | 10-2018-0085265 A | | 7/2018 |

OTHER PUBLICATIONS

Office Action received for Korean Patent Application No. 10-2023-7007643, mailed on Oct. 25, 2024, 14 pages (8 pages of English Translation and 6 pages of Original Document).

* cited by examiner

CONTACT INFORMATION PRESENTATION

RELATED APPLICATIONS

The present application is a continuation of International Application No. PCT/CN2022/077244, entitled "CONTACT INFORMATION DISPLAY METHOD AND APPARATUS, ELECTRONIC DEVICE, COMPUTER-READABLE STORAGE MEDIUM, AND COMPUTER PROGRAM PRODUCT" and filed on Feb. 22, 2022, which claims priority to Chinese Patent Application No. 202110269698.7, entitled "CONTACT INFORMATION DISPLAY METHOD AND DEVICE, COMPUTER EQUIPMENT AND STORAGE MEDIUM" and filed on Mar. 12, 2021. The entire disclosures of the prior applications are hereby incorporated by reference in their entirety.

FIELD OF THE TECHNOLOGY

This application relates to the Internet application field, including a contact information presentation.

BACKGROUND OF THE DISCLOSURE

In applications such as a game application, a social application, and a contact management application based on a virtual scene, a social interaction function between users is usually involved, for example, the user may add contacts in the game application and interact with the contacts in a contact interface.

In general, in order to facilitate interaction between the user and the contacts in the game application, items of contact information are usually presented in a list form in the contact interface, and basic information of the corresponding contact and interaction controls are presented in each item of contact information.

However, the manner of presenting items of contact information through a list limits the size of contact information elements and interaction controls, resulting in a relatively poor information display effect and a relatively low accuracy of control triggering. Consequently, interaction efficiency based on the contact information is relatively low.

SUMMARY

Embodiments of this disclosure provide a contact information presentation method, apparatus and electronic device, a non-transitory computer-readable storage medium, and a computer program product, which can improve the presentation effect of the contact information and the interaction efficiency based on the contact information.

Some aspects of the disclosure provide a method for contact information presentation on an electronic device. The method includes providing a contact interface for an application including a virtual scene, and presenting a front side of a contact card associated with a contact in the contact interface. The front side includes a virtual avatar of the contact in the virtual scene. The method further includes detecting a first operation on the front side of the contact card; and in response to the first operation, presenting a back side of the contact card in the contact interface. The back side includes at least one interaction control for an interaction with the contact.

Some aspects of the disclosure provide an apparatus for contact information presentation, including processing circuitry. The processing circuitry is configured to provide a contact interface for an application including a virtual scene, and present a front side of a contact card associated with a contact in the contact interface. The front side includes a virtual avatar of the contact in the virtual scene. The processing circuitry is configured to detect a first operation on the front side of the contact card. In response to the first operation, the processing circuitry is configured to present a back side of the contact card in the contact interface. The back side includes at least one interaction control for an interaction with the contact.

The embodiments of this disclosure provide an electronic device for contact information presentation, including a processor (also referred to as processing circuitry in some examples) and a memory, the memory storing at least one computer program, the at least one computer program being loaded and executed by the processor to implement the contact information presentation method according to the embodiments of this disclosure.

The embodiments of this disclosure provide a non-transitory computer-readable storage medium (e.g., non-transitory computer-readable storage medium), storing instructions which when executed by a processor cause the processor to perform the contact information presentation method according to the embodiments of this disclosure.

The embodiments of this disclosure provide a computer program product or a computer program. The computer program product or the computer program includes a computer instruction, the computer instruction being stored in a computer-readable storage medium. A processor of an electronic device reads the computer instruction from the computer-readable storage medium and executes the computer instruction, to cause the electronic device to perform the contact information presentation method according to the embodiments of this disclosure.

BRIEF DESCRIPTION OF THE DRAWINGS

To describe the technical solutions in the embodiments of this disclosure more clearly, the following briefly introduces the accompanying drawings required for describing the embodiments. The accompanying drawings in the following description show some embodiments of this disclosure.

DESCRIPTION OF EMBODIMENTS

Figure 1:
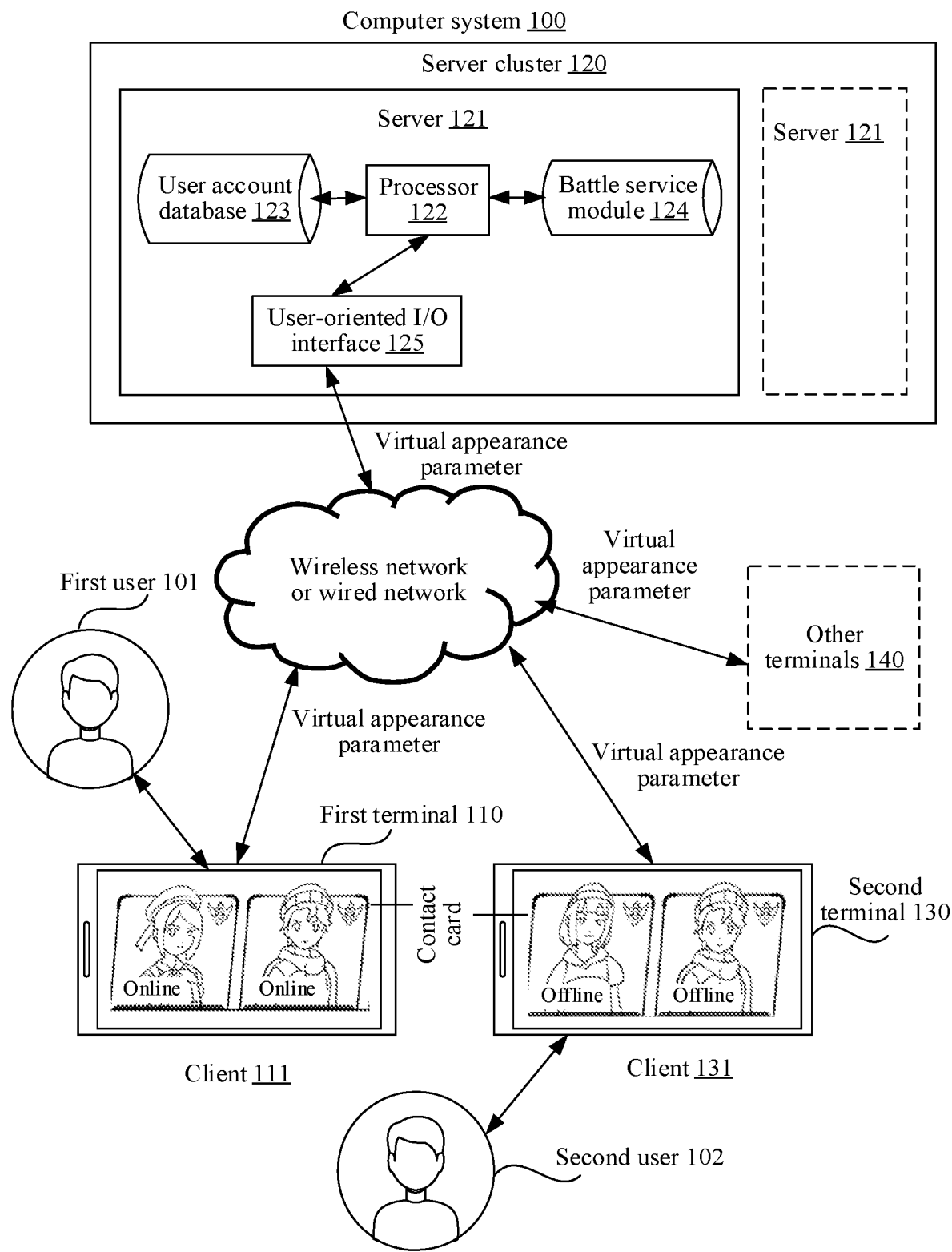
FIG. 1 is a structural block diagram of a computer system according to an embodiment of this disclosure.

Embodiments of this disclosure are described in detail herein, and examples thereof are shown in the accompanying drawings. When the following descriptions are made with reference to the accompanying drawings, unless otherwise indicated, the same numbers in different accompanying drawings represent the same or similar elements. Implementations described in the embodiments of this disclosure do not represent all implementations that are consistent with this disclosure. Instead, they are merely examples of apparatuses and methods consistent with this disclosure as recited in the appended claims.

In the embodiments of this disclosure, "one or multiple" refers to one or more, and "multiple" refers to two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects.

For convenience of understanding, terms involved in this disclosure are described below.

1) Virtual scene includes a virtual scene displayed (or provided) by an application program when run on a terminal. The virtual scene may be any one of a two-dimensional virtual scene, a 2.5-dimensional virtual scene, and a three-dimensional virtual scene, and description is made by using an example in which the virtual scene is a three-dimensional virtual scene in the embodiments of this disclosure. In the embodiments of this disclosure, the virtual scene is further used for a virtual scene battle between at least two virtual roles. In the embodiments of this disclosure, there are virtual resources available for at least two virtual roles in the virtual scene.

2) Virtual object includes a movable object in a virtual scene. The movable object may be at least one of a virtual character, a virtual animal, and an animation character. In the embodiments of this disclosure, when the virtual scene is a three-dimensional virtual scene, the virtual object may be a three-dimensional model. Each virtual object has a shape and a volume in the three-dimensional virtual scene, and occupies some space in the three-dimensional virtual scene. In the embodiments of this disclosure, the virtual role is a three-dimensional role constructed based on a three-dimensional human skeleton technology, the virtual role wearing different skins to implement different appearances, for example, a virtual avatar corresponding to a target contact in the embodiments of this disclosure. In the embodiments of this disclosure, the virtual role may be alternatively implemented by using a 2.5-dimensional model or a two-dimensional model. This is not limited in the embodiments of this disclosure.

The contact information presentation method according to the embodiments of this disclosure may be applied to applications including contacts, such as a social application, a contact management application, and a game application. The social application may be, for example, an instant chatting application, in which each contact to be interacted with is displayed in a card form. In the contact management application, each contact to be managed is displayed in a card form. The game application may be, for example, a sandbox game, a virtual reality application program, a three-dimensional map program, a first person shooting game (FPS), a multiplayer online battle arena (MOBA), or a role playing game. The embodiments of this disclosure are described by using an example in which the method is applied to a game application.

In the embodiments of this disclosure, a virtual scene based on the game application includes maps of one or more game worlds. The virtual scene in the game application may be a scene that simulates the real world. A user may control a main control virtual object in the game application to perform, in the virtual scene, actions such as walking, running, jumping, shooting, fighting, driving, casting a skill, being attacked by another virtual object, being harmed in the virtual scene, and attacking another virtual object, which has relatively high interactivity. In addition, multiple users may form a team online to perform an arena game.

FIG. 1 is a structural block diagram of a computer system according to an embodiment of this disclosure. A computer system 100 includes: a first terminal 110, a server cluster 120, and a second terminal 130.

A client 111 supporting a virtual scene is installed and run on the first terminal 110, and the client 111 may be a multiplayer online battle program. When the first terminal runs the client 111, a user interface of the client 111 is displayed on a screen of the first terminal 110. The client may be any one of a military simulation program, a MOBA game, an escape shooting game, a simulation game (SLG), a sandbox game, and a role playing game. In the embodiments of this disclosure, an example in which the client is a MOBA game is used for description. The first terminal 110 is a terminal used by a first user 101. The first user 101 uses the first terminal 110 to control a first virtual object located in the virtual scene to perform activities, and the first virtual object may be referred to as a main control virtual object of the first user 101. The activities of the first virtual object include, but are not limited to: at least one of adjusting body postures, crawling, walking, running, riding, flying, jumping, driving, picking, shooting, attacking, and throwing. For example, the first virtual object is a first virtual character, such as a simulated character role or an animation character role.

A client 131 supporting a virtual scene is installed and run on the second terminal 130, and the client 131 may be a multiplayer online battle program. When the second terminal 130 runs the client 131, a user interface of the client 131 is displayed on a screen of the second terminal 130. The client may be any one of a MOBA game, an escape shooting game, and a SLG. In the embodiments of this disclosure, an example in which the client is a MOBA game is used for description. The second terminal 130 is a terminal used by a second user 102. The second user 102 uses the second terminal 130 to control a second virtual object located in the virtual scene to perform activities, and the second virtual object may be referred to as a main control virtual object of the second user 102. For example, the second virtual object is a second virtual character, such as a simulated character role or an animation character role.

In the embodiments of this disclosure, the first virtual character and the second virtual character are located in the same virtual scene. In the embodiments of this disclosure, the first virtual character and the second virtual character may belong to the same camp, the same team, or the same organization, have a friend relationship, or have a temporary communication permission. In the embodiments of this disclosure, the first virtual character and the second virtual character may belong to different camps, different teams, or different organizations, or have a hostile relationship with each other.

In the embodiments of this disclosure, the client installed on the first terminal 110 is the same as the client installed on the second terminal 130, or the clients installed on the two terminals are the same type of clients of different operating system platforms (Android system or iOS system). The first terminal 110 may generally refer to one of multiple terminals, and the second terminal 130 may generally refer to another one of the multiple terminals. In the embodiments of this disclosure, the first terminal 110 and the second terminal 130 are merely used as an example for description. The device types of the first terminal 110 and the second terminal 130 are the same or different. The device types include: at least one of a smartphone, a tablet computer, an e-book reader, a moving picture experts group audio layer III (MP3) player, a moving picture experts group audio layer IV (MP4) player, a laptop computer, and a desktop computer.

The computer system 100 in FIG. 1 further includes multiple other terminals 140, and the multiple other terminals 140 may access the server cluster 120. In the embodiments of this disclosure, one or more terminals 140 may be terminals corresponding to a developer. A developing and editing platform for the client of the virtual scene is installed on the terminal 140. The developer may edit and update the client on the terminal 140 and transmit an updated client installation package to the server cluster 120 by using a wired or wireless network. The first terminal 110 and the second terminal 130 may download the client installation package from the server cluster 120 to update the client. The first terminal 110, the second terminal 130, and the other terminals 140 are connected to the server cluster 120 by using a wireless network or a wired network.

The server cluster 120 includes at least one of one server, multiple servers, a cloud computing platform, and a virtualization center. The server cluster 120 is configured to provide a backend service for a client supporting a three-dimensional virtual scene. In the embodiments of this disclosure, the computing work undertaken by the server cluster 120 is more than that undertaken by the terminals; or the computing work undertaken by the server cluster 120 is less than or equal to that undertaken by the terminals; or the server cluster 120 and the terminals perform collaborative computing by using a distributed computing architecture between each other.

In the embodiments of this disclosure, the server cluster 120 includes at least one server 121. The server 121 includes a processor 122, a user account database 123, a battle service module 124, and a user-oriented input/output (I/O) interface 125. The processor 122 is configured to load instructions stored in the server 121, and process data in the user account database 121 and the battle service module 124. The user account database 121 is configured to store data of user accounts used by the first terminal 110, the second terminal 130, and the other terminals 140, for example, profile pictures of the user accounts, nicknames of the user accounts, battle effectiveness indexes of the user accounts, and service zones of the user accounts. The battle service module 124 is configured to provide multiple battle rooms for the users to battle, for example, a 1 versus (V) 1 battle room, a 3V3 battle room, a 5V5 battle room, an M V N battle room (where M and N are positive integers that are equal or not equal), and the like. The user-oriented I/O interface 125 is configured to establish communication between the first terminal 110 and/or the second terminal 130 via a wireless network or a wired network for data exchange.

In the computer system 100, the server cluster 120 is configured to send a virtual appearance parameter to the terminals (the first terminal 100, the second terminal 130, and the other terminals 140) via a network. The terminal is configured to receive the virtual appearance parameter sent by the server cluster 120 via a network, generate a virtual avatar based on the virtual appearance parameter, and display the virtual avatar on a front side of a contact card.

Figure 2:
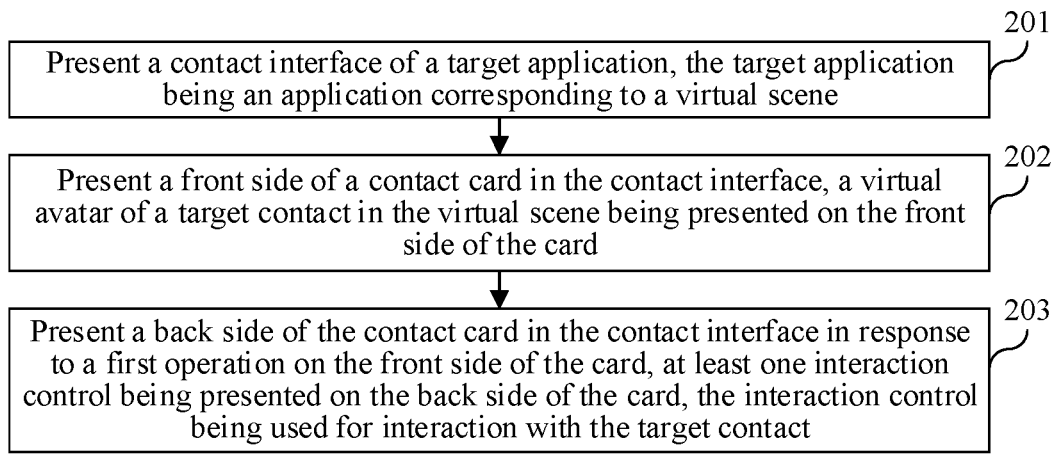
FIG. 2 is a flowchart of a contact information presentation method according to an embodiment of this disclosure.

FIG. 2 is a flowchart of a contact information presentation method according to an embodiment of this disclosure. The contact information presentation method may be performed by an electronic device running an application program corresponding to the virtual scene. For example, the electronic device may be a terminal (for example, each of the terminals in FIG. 1 described above), or the electronic device may be a server (for example, the server/server cluster in FIG. 1 described above). As shown in FIG. 2, the contact information presentation method may include step 201 to step 203. Steps are described below.

In step 201, a contact interface of a target application is presented, the target application is an application corresponding to a virtual scene;

The target application may be used to implement functions such as virtual scene matching, virtual scene presentation, and virtual avatar setting.

The virtual scene matching function may be to match a currently available virtual scene for the user through the server before the virtual scene presentation, so that the user controls a corresponding virtual object/virtual role in the virtual scene. Multiple users may be matched to the same virtual scene. For example, the multiple users matched to the same virtual scene may respectively control a corresponding virtual object/virtual role to interact with each other in the virtual scene, for example, battle in groups.

The virtual scene presentation function may be to present a matched virtual scene to the user after an available virtual scene is matched for the user.

The virtual avatar setting function may be a function for the user to set his/her own virtual avatar in the virtual scene before the user enters the virtual scene, including but not limited to setting virtual decorations, facial features, postural features, and the like corresponding to the virtual avatar, to obtain virtual appearance parameters corresponding to the virtual avatar. The target application may generate a corresponding virtual avatar based on the virtual appearance parameters.

In the embodiments of this disclosure, the target application corresponding to the virtual scene provides a social function based on the virtual scene, and all or part of the sub-functions of the social function may be implemented through the contact interface of the target application.

For example, the sub-functions implemented through the contact interface of the target application may include, and are not limited to, the following functions: viewing relevant information (such as the state and the avatar) of contacts (such as friends); managing contacts, such as deleting friends; and interacting with contacts, such as giving gifts and chatting.

In step 202, a front side of a contact card in the contact interface is presented, a virtual avatar of a target contact in the virtual scene is presented on the front side of the card.

In the embodiments of this disclosure, the contact interface may include contact cards respectively corresponding to contacts. Each contact card is divided into a front side of the card and a back side of the card, and the front side of the card and the back side of the card are opposite to each other.

When the presentation of the contact interface is triggered, the electronic device may present the front side of the card by default for each contact card.

In the embodiments of this disclosure, the front side of the contact card is used to present a virtual avatar of a corresponding contact in the virtual scene. The virtual avatar represents a personal avatar of the corresponding contact in the virtual scene.

The foregoing virtual avatar may be a three-dimensional avatar of the contact in the virtual scene, a two-dimensional image corresponding to the three-dimensional avatar of the contact in the virtual scene, a two-dimensional avatar of the contact in the virtual scene, or the like. In the target application such as the game application, a virtual avatar of a contact in the virtual scene is usually a sign that can intuitively represent the contact.

In step 203, a back side of the contact card is presented in the contact interface in response to a first operation on the front side of the card, at least one interaction control is presented on the back side of the card, the interaction control is used for interaction with the target contact.

In the embodiments of this disclosure, when a user operation is received, switching may be performed between the front side of the contact card and the back side of the contact card, to present different contents in the contact card. The first operation is a received user operation for switching from presentation of the front side of the card to presentation of the back side of the card.

In the embodiments of this disclosure, the foregoing first operation may be a touch operation on the front side of the card, such as a click operation, a double-click operation, and a slide operation; or may be a non-touch operation on the front side of the card, such as a non-touch gesture, a voice operation, and a shortcut key operation; or may be a result of execution of a received instruction for simulating to trigger the presentation of the back side of the card, such as a test instruction that triggers the presentation of the back side of the card for the front side of the card.

In the embodiments of this disclosure, when the electronic device receives the first operation on the front side of the card, interaction controls used for interaction with the corresponding target contact may be presented on the back side of the card.

Figure 3:
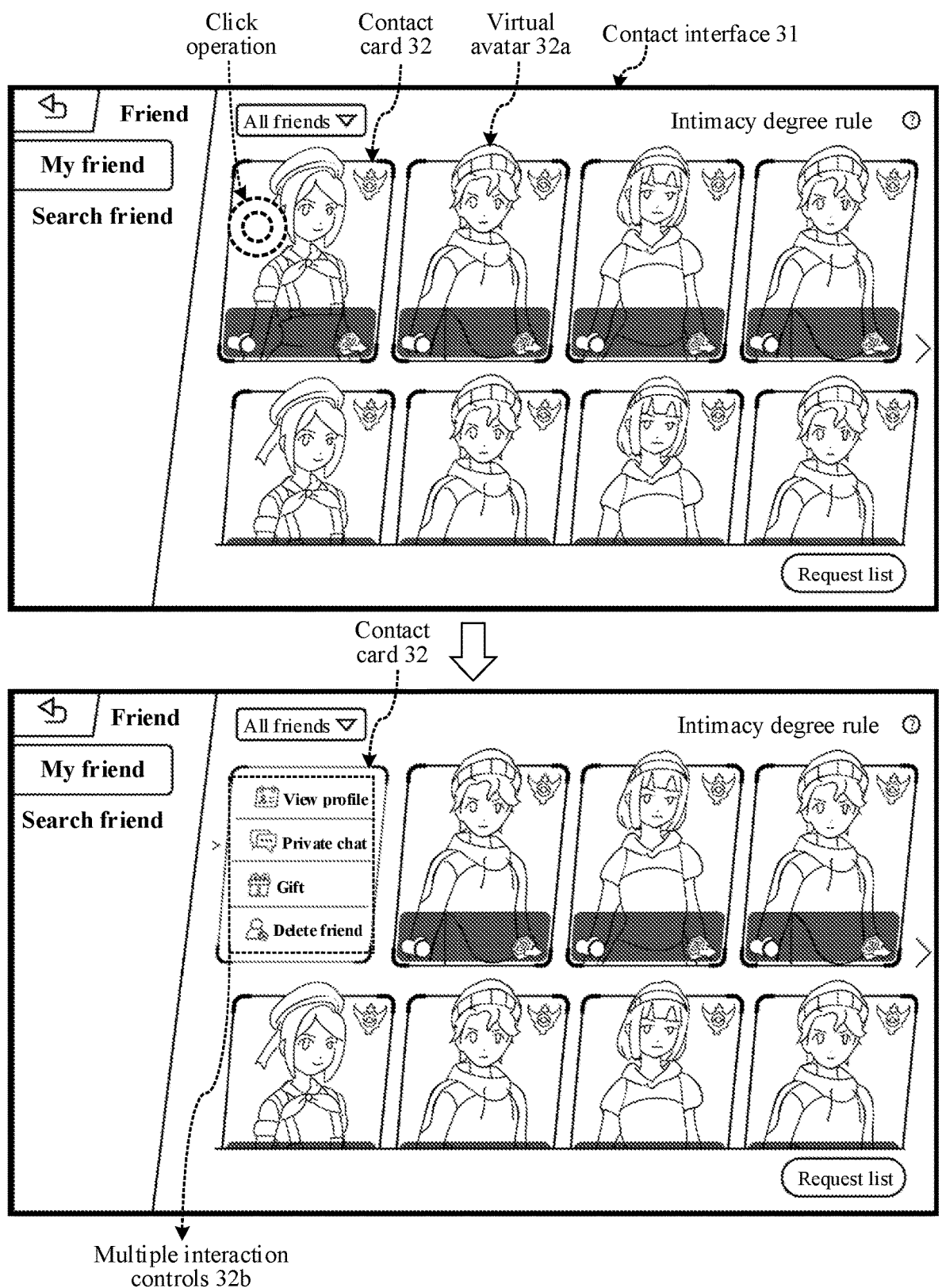
FIG. 3 is a schematic diagram of contact card presentation in FIG. 2 according to an embodiment of this disclosure.

FIG. 3 is a schematic diagram of contact card presentation according to an embodiment of this disclosure. As shown in FIG. 3, the user triggers the target application to present a contact interface 31, and the contact interface 31 includes a contact card 32 respectively corresponding to at least one contact. The contact card 32 is presented by using the front side of the card at an initial moment, and a virtual avatar 32a of a corresponding contact in the virtual scene is presented on the front side of the card.

In FIG. 3, when the user performs the first operation (such as a click operation) on the contact card 32 that is presented by using the front side of the card, the contact card 32 is flipped and is presented by using the back side of the card, and multiple interaction controls 32b corresponding to the contact are presented on the back side of the card.

It may be understood that, according to the contact information presentation method according to the embodiments of this disclosure, in the contact interface of the target application corresponding to the virtual scene, contact information is presented in a card form, and the front side of the card and the back side of the card are respectively used to present the virtual avatar of the contact and the interaction control. Compared with a list form, the foregoing card form enables the information element (virtual avatar) of the contact and the interaction control to be presented in a relatively large size. The information display effect is ensured and the accuracy of control triggering is improved, thereby improving the interaction efficiency based on the contact information.

The back side of the contact card may include at least one page, and each of the at least one page is used to present different information. For example, one page is used to present at least one interaction control. In another example, one page is used to present the battle situation. In yet another example, one page is used to present the ranking. In addition, the at least one page corresponds to the presentation order. For example, the presentation of an $i^{th}$ page is implemented by triggering the processing of the next page of an page, where i is a positive integer greater than 1.

Figure 4:
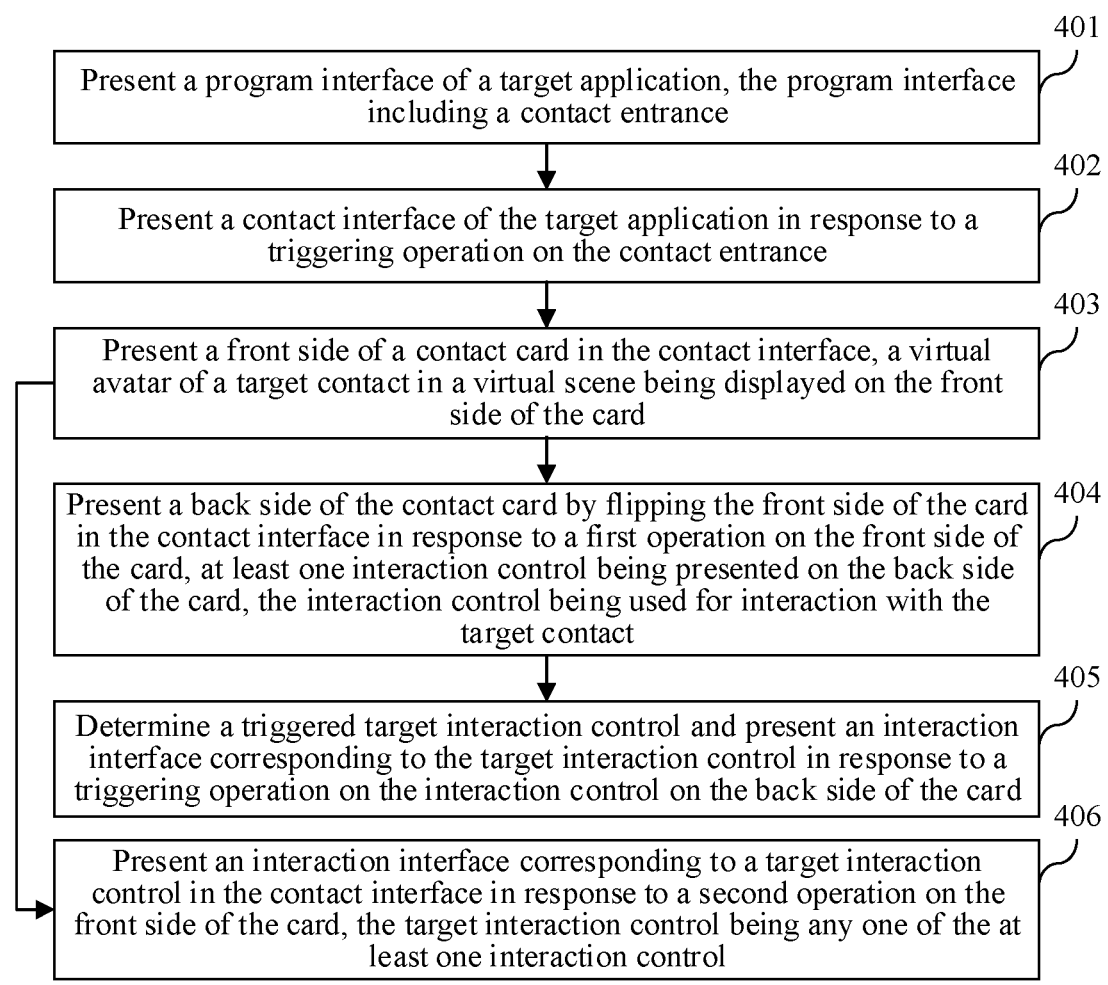
FIG. 4 is a flowchart of a contact information presentation method according to an embodiment of this disclosure.

FIG. 4 is a flowchart of a contact information presentation method according to an embodiment of this disclosure. The contact information presentation method may be performed by an electronic device running a target application corresponding to the virtual scene. For example, the electronic device may be a terminal (for example, each of the terminals in FIG. 1 described above), or the electronic device may be a server (for example, the server/server cluster in FIG. 1 described above). As shown in FIG. 4, the contact information presentation method may include step 401 to step 406. Steps are described below.

In step 401, a program interface of a target application is presented, the program interface includes a contact entrance.

In the embodiments of this disclosure, after the user opens the target application, the electronic device may present the program interface through the target application. The program interface includes one or multiple function entrances, such as a contact entrance (such as a "friends" label), a matching entrance (such as a "start game" label), and an avatar setting entrance (such as an "avatar" label).

In step 402, a contact interface of the target application is presented in response to a triggering operation on the contact entrance.

For example, when the electronic device detects a triggering operation on the contact entrance, such as a click on the contact entrance, a contact interface of the target application may be presented in an interface switching manner.

In step 403, a front side of a contact card is presented in the contact interface, a virtual avatar of a target contact in a virtual scene is displayed on the front side of the card.

In the embodiments of this disclosure, the virtual avatar of the target contact in the virtual scene may be a virtual avatar of a corresponding virtual object of the target contact in the virtual scene, and the virtual avatar may be set by the target contact.

In the embodiments of this disclosure, the presenting, by the electronic device, a front side of a contact card in the contact interface includes: obtaining, by the electronic device, a virtual appearance parameter corresponding to the target contact from a server; generating a corresponding virtual model of the target contact in the virtual scene based on the virtual appearance parameter; obtaining the virtual avatar based on the virtual model; and presenting the front side of the contact card in the contact interface based on the virtual avatar.

In the embodiments of this disclosure, information related to the virtual avatar of the target contact may be stored in the server. When the electronic device needs to present the front side of the contact card of the target contact, the virtual appearance parameter of the target contact may be obtained from the server, then the corresponding virtual model of the contact in the virtual scene is generated based on the virtual appearance parameter, and subsequently, the virtual avatar of the target contact is generated based on the virtual model. Finally, the electronic device may generate the front side of the contact card with the virtual avatar according to a preset card template, and present the front side of the contact card in the contact interface.

The virtual appearance parameter is used for indicating various appearance attributes of the virtual avatar of the corresponding contact. For example, the virtual appearance parameter may be used to indicate the gender, facial features (including hair style, hair color, face shape, size of five sense organs, shape of five sense organs, skin color, and the like), postural features (height, measurements, leg-to-body ratio, and the like), and decorations (such as clothing and accessories) of the virtual avatar. The virtual model may be a three-dimensional model or a two-dimensional model, which is not limited in the embodiments of this disclosure.

In the embodiments of this disclosure, the obtaining, by the electronic device, the virtual avatar based on the virtual model includes: performing, by the electronic device, image shooting on the virtual model to obtain the virtual avatar; or determining, by the electronic device, the virtual model as the virtual avatar.

In the embodiments of this disclosure, the foregoing virtual avatar may be a two-dimensional virtual avatar. In this case, when the virtual model is a three-dimensional model, the electronic device may, after generating the virtual model, shoot the virtual model with specified shooting parameters through a virtual camera, to obtain a two-dimensional virtual avatar.

The foregoing specified shooting parameters may be preset shooting parameters, or the foregoing shooting parameters may be shooting parameters set by the user, or the foregoing shooting parameters may be shooting parameters obtained by the electronic device itself.

In the embodiments of this disclosure, when the electronic device obtains the shooting parameters by itself, the electronic device may obtain information for determining the shooting parameters, such as the intimacy degree between the accounts respectively corresponding to the target contact and the current user, and the level of the target contact (such as the privilege level). The electronic device determines the foregoing specified shooting parameters according to the information for determining the shooting parameters. For example, the computer device may determine a shooting distance in the specified shooting parameters according to the intimacy degree of the current user, where the shooting distance and the intimacy degree are negatively correlated, that is, the higher the intimacy degree between the target contact and the current user, the closer the shooting distance, and correspondingly, the larger the size of the obtained two-dimensional virtual avatar.

In the embodiments of this disclosure, the foregoing virtual avatar may be a three-dimensional virtual avatar. In this case, the electronic device may directly use the three-dimensional virtual model as the virtual avatar and present the virtual avatar on the front side of the card.

The foregoing virtual avatar may be an entire-body avatar corresponding to the virtual model, or may be a partial avatar corresponding to the virtual model (such as an upper-body avatar). In the embodiments of this disclosure, the performing, by the electronic device, image shooting on the virtual model may be to obtain the partial avatar corresponding to the virtual model; and the determining, by the electronic device, the virtual model as the virtual avatar may be to obtain the entire-body avatar corresponding to the virtual model.

In the embodiments of this disclosure, the virtual appearance parameter is used for indicating a virtual decoration of at least one part of the virtual model; and before the generating, by the electronic device, a virtual model of the target contact in the virtual scene based on the virtual appearance parameter, the contact information presentation method further includes: obtaining, in a case that the electronic device obtains failure information from the server, a virtual decoration of the at least one part corresponding to a target user account, the failure information being used for indicating that the obtaining of the virtual appearance parameter fails (for example, the virtual appearance parameter is not obtained), and the target user account being a user account logged in in the electronic device that presents the contact interface; and determining the virtual decoration of the at least one part of the virtual model based on the virtual decoration of the at least one part of the target user account, and determining the determined virtual decoration of the at least one part of the virtual model as the virtual appearance parameter, to obtain the virtual appearance parameter by randomly matching the virtual decoration of the at least one part corresponding to the target user account.

In the embodiments of this disclosure, the electronic device may fail to obtain the virtual appearance parameter of the target contact from the server for various reasons. For example, in a case that the target contact sets privacy protection for his/her own virtual avatar, or the target contact does not set his/her own virtual avatar, in order to avoid an influence on the presentation effect of the front side of the contact card, the influence being produced because the virtual avatar of the target contact cannot be displayed, the electronic device may perform random matching according to the virtual accessories owned by the current user, to obtain the virtual appearance parameter of the target contact.

For example, the current user himself/herself has three available virtual accessories corresponding to each of the foregoing at least one part, and the computer device may randomly select one virtual accessory for each part in the virtual accessories owned by the current user for matching, to obtain the virtual appearance parameter of the target contact.

In the embodiments of this disclosure, when the electronic device obtains the information used for indicating that the obtaining of the virtual appearance parameter fails from the server, a specified virtual appearance parameter may be determined as the virtual appearance parameter, or a historical virtual appearance parameter of the target contact may be determined as the virtual appearance parameter, which is not limited in the embodiments of this disclosure.

In the embodiments of this disclosure, the presenting, by the electronic device, a front side of a contact card in the contact interface includes: obtaining, by the electronic device, the virtual avatar from the server; and presenting the front side of the contact card in the contact interface based on the virtual avatar.

The foregoing virtual avatar may alternatively be directly provided by the server to the electronic device, that is, the electronic device does not need to generate the virtual avatar of the target contact by itself; where the virtual avatar is generated by the server based on the virtual appearance parameter corresponding to the target contact, that is, the server obtains the virtual appearance parameter, generates the virtual model based on the virtual appearance parameter, and obtains the virtual avatar based on the virtual model. In addition, the manner of obtaining the virtual appearance parameter on the server side is the same as the manner of obtaining the virtual appearance parameter on the electronic device side, and the process of obtaining the virtual avatar based on the virtual model on the server side is the same as the process of obtaining the virtual avatar based on the virtual model on the electronic device side.

In the embodiments of this disclosure, based on a virtual role controlled by the target contact in the virtual scene, the electronic device presents role information of the virtual role on the front side of the card.

In the embodiments of this disclosure, because the virtual avatar of the contact and the interaction control are respectively presented on the front side of the card and the back side of the card, the front side of the card may have a sufficient space to present information in addition to the virtual avatar. For example, when the target contact currently controls a virtual role to perform interaction (for example, battling) in the virtual scene, role information of the virtual role currently controlled by the target contact may be presented on the front side of the contact card of the target contact, to enrich contact information that can be presented, thereby improving the presentation effect of the contact information and improving the interaction efficiency.

In the embodiments of this disclosure, the presenting, by the electronic device based on a virtual role controlled by the target contact in the virtual scene, role information of the virtual role on the front side of the card includes: presenting, by the electronic device based on the virtual role controlled by the target contact in the virtual scene, the virtual avatar by presenting a role avatar of the virtual role on the front side of the card.

In the embodiments of this disclosure, when the electronic device presents the role information of the virtual role currently controlled by the target contact on the front side of the contact card of the target contact, the electronic device may present the role avatar of the virtual role on the front side of the contact card, thereby intuitively presenting the virtual role currently controlled by the target contact.

In the embodiments of this disclosure, when the electronic device presents the role information of the virtual role currently controlled by the target contact on the front side of the contact card of the target contact, the electronic device may further present, on the front side of the contact card, the corresponding interaction results of the virtual role in the virtual scene, such as a quantity of slaying times, a quantity of times of being slain, a quantity of assist times, a total quantity of resources obtained, virtual equipment obtained, and the like.

In the embodiments of this disclosure, basic information of the target contact is further presented on the front side of the card, the basic information including at least one of the following information: contact name, level, dan (e.g., also referred to as rank), online state, and intimacy degree.

Figure 5:
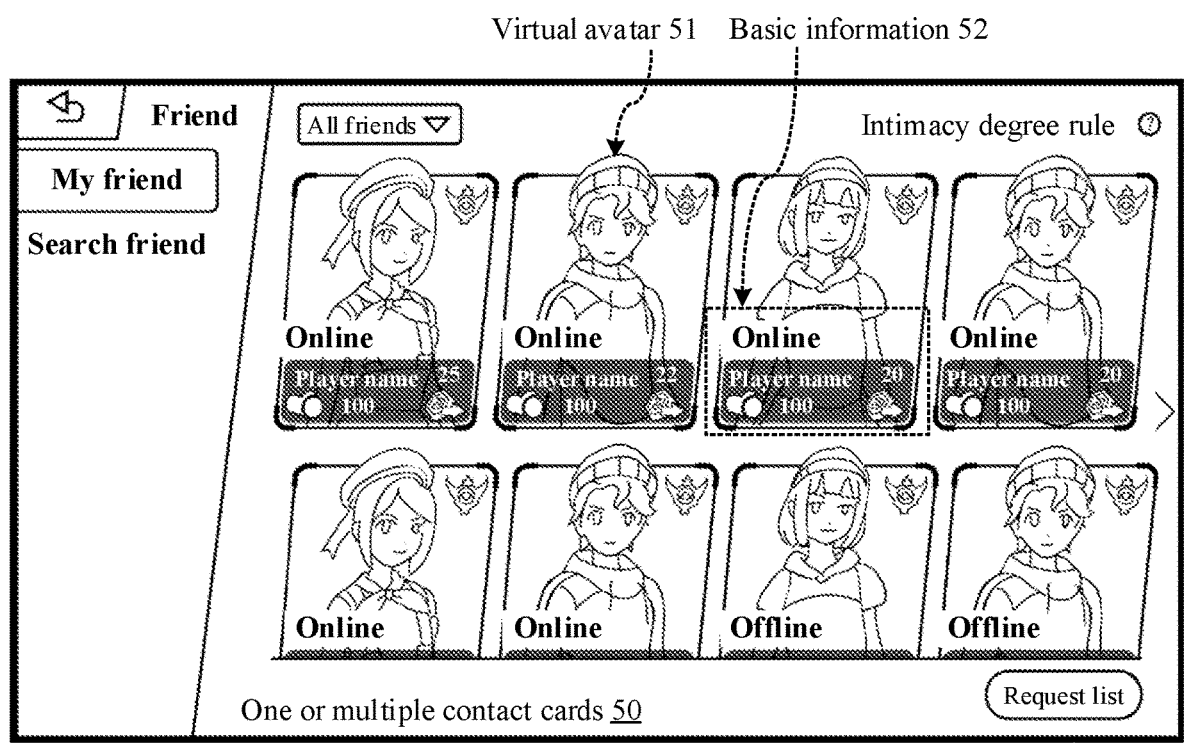
FIG. 5 is a schematic diagram of a contact interface in FIG. 4 according to an embodiment of this disclosure.

For example, FIG. 5 is a schematic diagram of a contact interface according to an embodiment of this disclosure. As shown in FIG. 5, the contact interface includes one or multiple contact cards 50, and each contact card corresponds to one contact. Each contact card includes a virtual avatar 51 of a corresponding contact, and basic information 52 of the corresponding contact.

Figure 6:
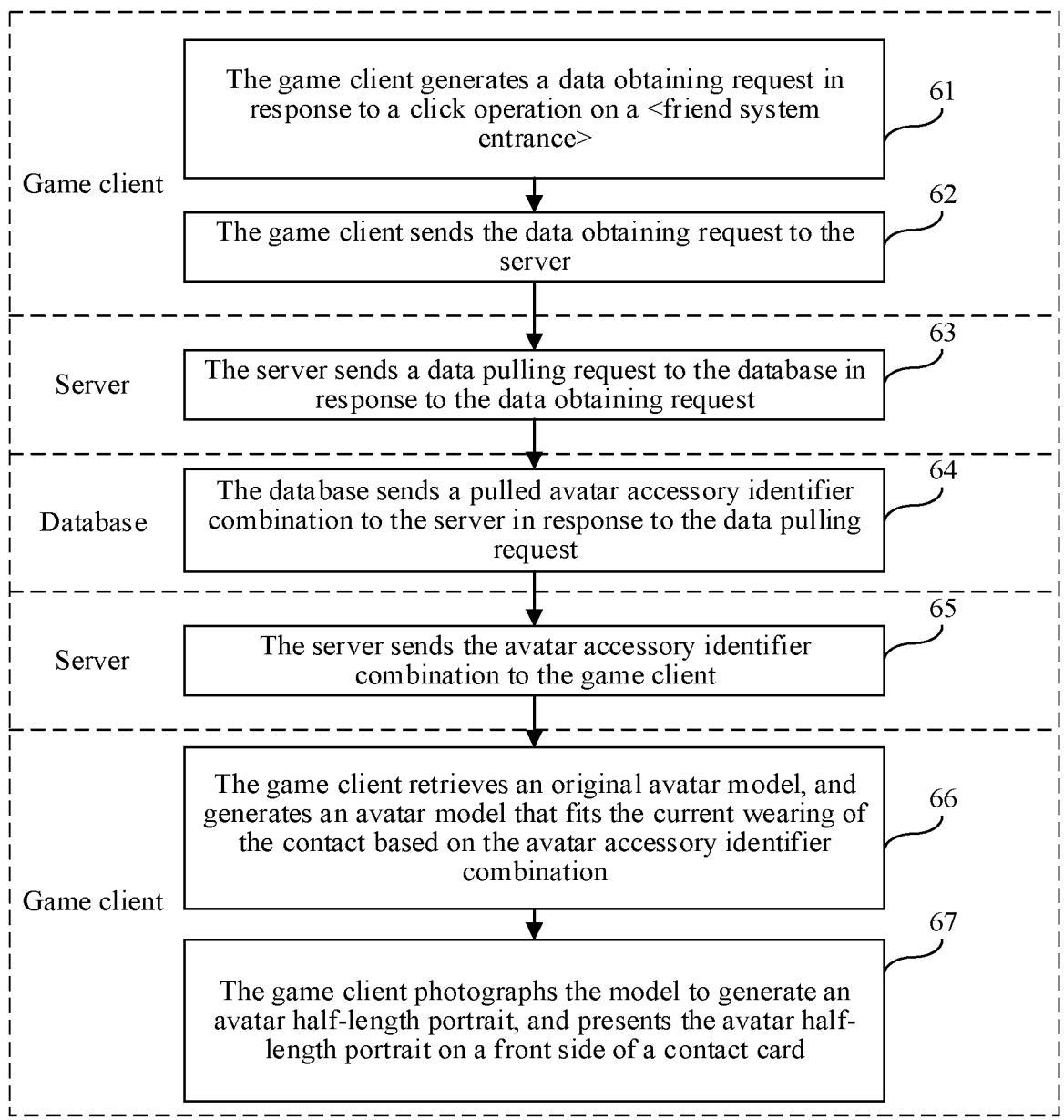
FIG. 6 is a flowchart of virtual avatar presentation in FIG. 4 according to an embodiment of this disclosure.

FIG. 6 is a flowchart of virtual avatar presentation according to an embodiment of this disclosure. As shown in FIG. 6, the virtual avatar presentation flow is performed by a game client (referred to as the electronic device for contact information presentation), a server, and a database installed in the terminal. The process of presenting the virtual avatar of the contact on the front side of the card may include steps 61 to 67. Steps are described below.

In step 61, the game client generates a data obtaining request in response to a click operation on a <friend system entrance>.

When the user clicks the <friend system entrance>, the game client receives the click operation on the <friend system entrance>. In this case, in response to the click operation, the game client generates the data obtaining request used for obtaining an avatar accessory identifier combination (referred to as the virtual appearance parameter).

In step 62, the game client sends the data obtaining request to the server.

After generating the data obtaining request, the game client sends the data obtaining request to the server, to obtain the avatar identifier combination from the server.

In step 63, the server sends a data pulling request to the database in response to the data obtaining request. The data pulling request is used for obtaining avatar identifier combination data in the database.

In step 64, the database sends a pulled avatar accessory identifier combination to the server in response to the data pulling request.

In response to the data pulling request, the database begins to refresh an <avatar accessory identifier (ID)>table, to obtain the avatar accessory identifier combination, where the <avatar accessory identifier (ID)>table stores, in real time, accessory IDs (such as a top ID, a bottom ID, a headwear ID, a back accessory ID, a handheld object ID, a shoes ID, and the like) currently worn by the contact avatar.

In step 65, the server sends the avatar accessory identifier combination to the game client.

In step 66, the game client retrieves an original avatar model, and generates an avatar model that fits the current wearing of the contact (referred to as a virtual model) based on the avatar accessory identifier combination.

In step 67, the game client photographs the model to generate an avatar half-length portrait (referred to as a virtual avatar), and presents the avatar half-length portrait on a front side of a contact card.

In step 404, a back side of the contact card is presented by flipping the front side of the card in the contact interface (e.g., a card flipping animation) in response to a first operation on the front side of the card, at least one interaction control being presented on the back side of the card, the interaction control being used for interaction with the target contact.

In the embodiments of this disclosure, when the contact card corresponding to the target contact is presented by using the front side of the card, and the first operation (such as a click operation) is received, the electronic device may flip the contact card of the target contact, to present the back side of the contact card of the target contact. For contact cards of other contacts in the contact interface, a state in which the front side of the card is presented may be maintained.

In the embodiments of this disclosure, when the contact card of the target contact is triggered by the first operation to flip to the back side of the card for presentation, the electronic device may present at least one interaction control on the back side of the card.

Figure 7:
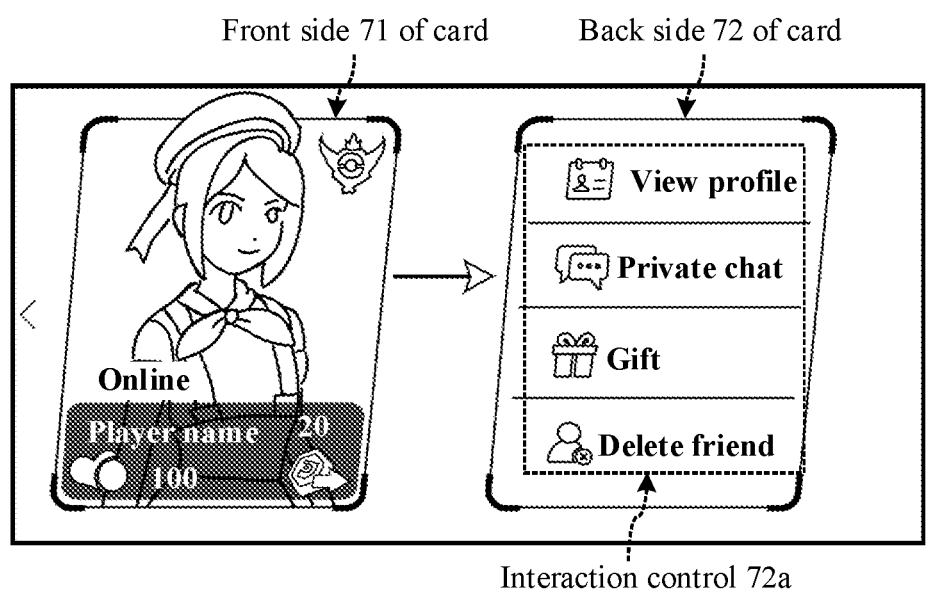
FIG. 7 is a first schematic diagram of card flip in FIG. 4 according to an embodiment of this disclosure.

For example, FIG. 7 is a schematic diagram of card flip according to an embodiment of this disclosure. As shown in FIG. 7, after receiving the click operation by the user, a front side 71 of the card of the contact card may be flipped to present a back side 72 of the card of the same contact card, and interaction controls 72a are presented on the back side 72 of the card.

As can be seen from FIG. 5 and FIG. 7, by presenting the contact information in the card form, and respectively presenting the virtual avatar and the interaction control on the front side of the contact card and the back side of the contact card, various information elements and controls can be presented in a relatively large size compared with that in the list form.

In step 405, a triggered target interaction control is determined and an interaction interface corresponding to the target interaction control is presented in response to a triggering operation on the interaction control on the back side of the card.

In step 406, an interaction interface corresponding to a target interaction control is presented in the contact interface in response to a second operation on the front side of the card, the target interaction control is any one of the at least one interaction control.

In the embodiments of this disclosure, in addition to presenting the interaction interface by triggering the interaction control on the back side of the card, the electronic device may alternatively present the corresponding interaction interface by directly triggering the interaction control on the front side of the card.

In the embodiments of this disclosure, the presenting, by the electronic device, an interaction interface corresponding to a target interaction control in the contact interface in response to a second operation on the front side of the card includes: determining, by the electronic device, the target interaction control based on an operation type of the second operation in response to the second operation on the front side of the card; and presenting, by the electronic device, the interaction interface corresponding to the target interaction control in the contact interface.

In the embodiments of this disclosure, when the interaction control corresponding to the contact card includes multiple interaction controls, interaction interfaces corresponding to different interaction controls may be directly triggered for presentation by different types of second operations.

The electronic device may determine a corresponding target interaction control through a correspondence between the operation type of the second operation and the target interaction control.

For example, when the operation type of the second operation is swiping left, the electronic device may determine that the target interaction control is a "view profile" control, and present a "contact profile" interface of the target contact in the contact interface. Alternatively, when the operation type of the second operation is swiping right, the electronic device may determine that the target interaction control is a "gift" control, and present a gift giving interface of the target contact in the contact interface. Alternatively, when the operation type of the second operation is a long press operation, the electronic device may determine that the target interaction control is a "delete friend" control, and present a reminder interface in the contact interface to confirm whether to delete the contact.

The foregoing correspondence between the operation type of the second operation and the target interaction control may be preset or may be set by the user, which is not limited in the embodiments of this disclosure.

In the embodiments of this disclosure, the presenting, by the electronic device, an interaction interface corresponding to a target interaction control in the contact interface in response to a second operation on the front side of the card includes: presenting, by the electronic device, the back side of the contact card and presenting the interaction interface corresponding to the target interaction control on the back side of the card in response to the second operation on the front side of the card.

In the embodiments of this disclosure, the electronic device may, when receiving the second operation, flip the front side of the contact card of the target contact, to present the back side of the contact card and present the interaction interface of the target interaction control on the back side of the card.

That is, in the embodiments of this disclosure, contents presented on the back side of the card triggered by the first operation are different from contents presented on the back side of the card triggered by the second operation, where the back side of the card triggered by the first operation is used to present the at least one interaction control, and the back side of the card triggered by the second operation is used to present the interaction interface of the target interaction control.

In the embodiments of this disclosure, the foregoing interaction interface corresponding to the target interaction control may alternatively be presented independently of the contact card, such as being presented on the contact card in a superimposition manner, or being presented in a way of switching to another interface other than the contact interface.

In the embodiments of this disclosure, the presenting, by the electronic device, the back side of the contact card in response to the second operation on the front side of the card includes: performing, by the electronic device, flip in a flip direction corresponding to the target interaction control to present the back side of the contact card in response to the second operation on the front side of the card.

In the embodiments of this disclosure, the flip direction of the contact card triggered by the second operation may be different for the different interaction interfaces presented on the back side of the card triggered by the second operation.

For example, when the operation type of the second operation is swiping left, the electronic device determines that the target interaction control is a "view profile" control, and the electronic device may control the contact card to flip to the left to present the back side of the card, and present a "contact profile" interface of the target contact on the back side of the card presented by flipping. Alternatively, when the operation type of the second operation is swiping right, the electronic device determines that the target interaction control is a "gift" control, and the electronic device may control the contact card to flip to the right to present the back side of the card, and present a gift giving interface of the target contact on the back side of the card presented by flipping. Alternatively, when the operation type of the second operation is a long press operation, the electronic device determines that the target interaction control is a "delete friend" control, and the electronic device may control the contact card to flip upwards to present the back side of the card, and present a reminder interface on the back side of the card presented by flipping to confirm whether to delete the contact.

Figure 8:
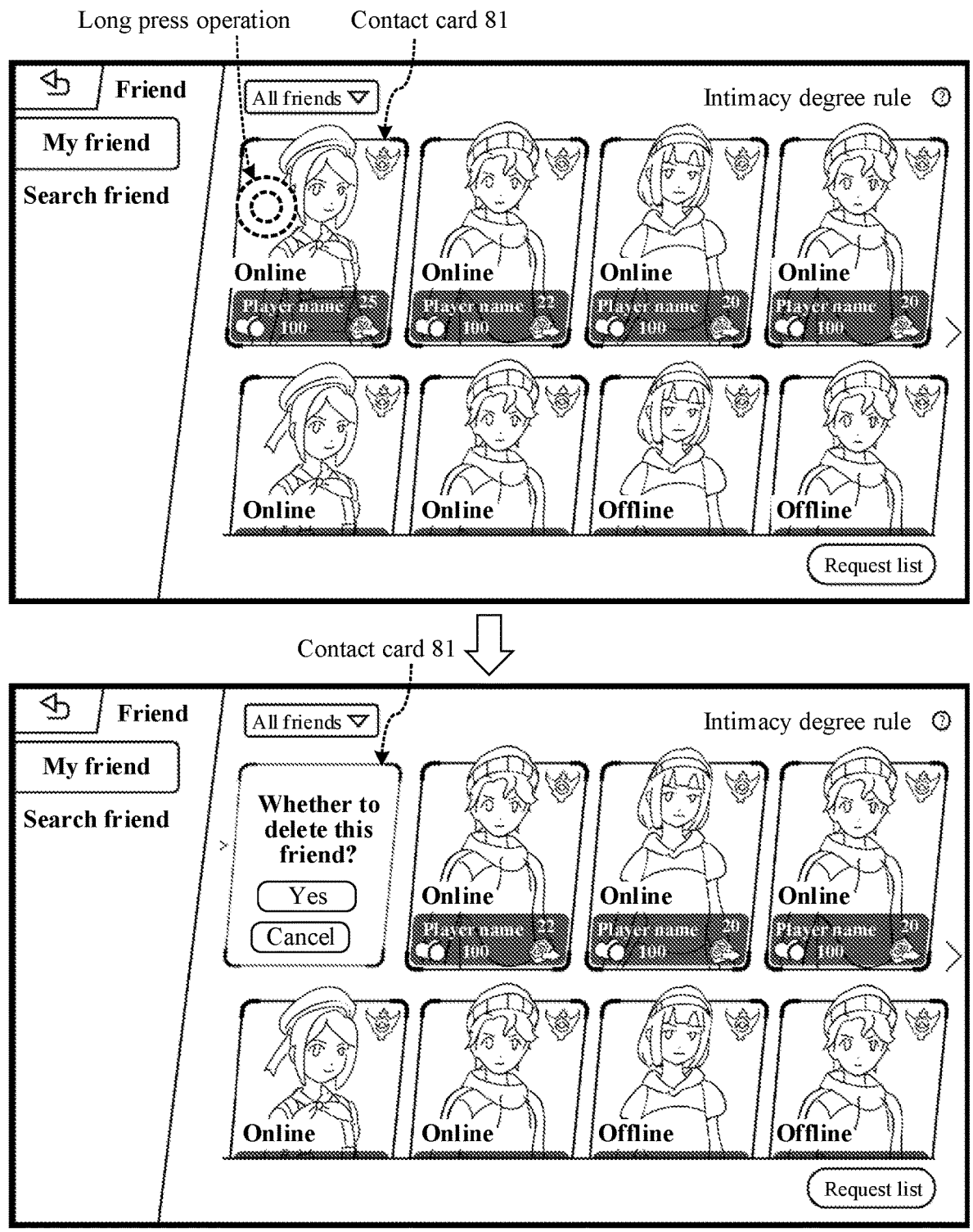
FIG. 8 is a second schematic diagram of card flip in FIG. 4 according to an embodiment of this disclosure.

For example, FIG. 8 is another schematic diagram of card flip according to an embodiment of this disclosure. As shown in FIG. 8, when the contact interface is initially presented, a contact card 81 is presented by using the front side of the card. When it is detected that the user performs a long press operation on the contact card 81 which is presented in a form of the front side of the card, the contact card 81 is flipped upwards, and a deletion reminder interface is presented on the contact card 81 which is presented in a form of the back side of the card after the flipping. After the user clicks an "Yes" control in the interface, the contact card 81 can be deleted from the contact interface.

It may be understood that, according to the contact information presentation method according to the embodiments of this disclosure, in the contact interface of the target application corresponding to the virtual scene, contact information is presented by a card, and the front side of the card and the back side of the card are respectively used to present the virtual avatar of the contact and the interaction control. Compared with a list form, the foregoing card form enables the information element (virtual avatar) of the contact and the interaction control to be presented in a relatively large size. The information display effect is ensured and the accuracy of control triggering is improved, thereby improving the interaction efficiency based on the contact information.

The contact information presentation method according to the embodiments of this disclosure may be applied to present friend information in game applications, and causes two types of functions, namely the presentation function and the operation function, to be compatible with each other by flipping the contact card. By utilizing a physical property of the card, that is, being able to be flipped, the front side mainly presents the avatar of the user, and the back side is responsible for a further social interaction operation. In addition, presentation in the card form can enhance the communication and immersion of the virtual avatar in and out of the game, and enhance the rendering effect. For example, by using the half-length portrait of the virtual avatar as the virtual avatar of the corresponding contact, the presentation window of the virtual avatar is increased, and the unity with the virtual scene and the immersion sense of the virtual role in the virtual scene are maintained.

Figure 9:
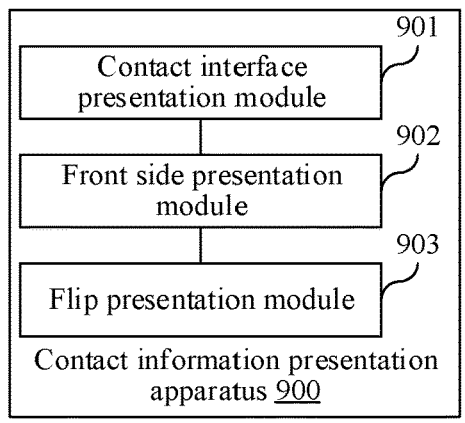
FIG. 9 is a structural block diagram of a contact information presentation apparatus according to an embodiment of this disclosure.

FIG. 9 is a structural block diagram of a contact information presentation apparatus according to an exemplary embodiment of this disclosure. As shown in FIG. 9, a contact information presentation apparatus 900 includes a contact interface presentation module 901, a front side presentation module 902, and a flip presentation module 903. One or more modules, submodules, and/or units of the apparatus can be implemented by processing circuitry, software, or a combination thereof, for example.

The contact interface presentation module 901 is configured to present a contact interface of a target application, the target application being an application corresponding to a virtual scene.

The front side presentation module 902 is configured to present a front side of a contact card in the contact interface, a virtual avatar of a target contact in the virtual scene being presented on the front side of the card.

The flip presentation module 903 is configured to present a back side of the contact card in the contact interface in response to a first operation on the front side of the card, at least one interaction control being presented on the back side of the card, the interaction control being used for interaction with the target contact.

In the embodiments of this disclosure, the front side presentation module 902 is further configured to obtain a virtual appearance parameter corresponding to the target contact from a server; generate a virtual model of the target contact in the virtual scene based on the virtual appearance parameter; and obtain the virtual avatar based on the virtual model.

In the embodiments of this disclosure, the front side presentation module 902 is further configured to perform image shooting on the virtual model to obtain the virtual avatar; or determine the virtual model as the virtual avatar.

In the embodiments of this disclosure, the virtual appearance parameter is used for indicating a virtual decoration of at least one part of the virtual model; and the front side presentation module 902 is further configured to obtain, in a case that failure information is obtained from the server, a virtual decoration of the at least one part corresponding to a target user account, the failure information being used for indicating that the obtaining of the virtual appearance parameter fails, and the target user account being a user account logged in in the electronic device; and determine the virtual decoration of the at least one part of the virtual model based on the virtual decoration of the at least one part of the target user account, and determine the determined virtual decoration of the at least one part of the virtual model as the virtual appearance parameter.

In the embodiments of this disclosure, the front side presentation module 902 is further configured to obtain the virtual avatar from a server, the virtual avatar being generated by the server based on a virtual appearance parameter corresponding to the target contact.

In the embodiments of this disclosure, the flip presentation module 903 is further configured to present the back side of the contact card in the contact interface by flipping the front side of the card in response to the first operation on the front side of the card.

In the embodiments of this disclosure, basic information of the target contact is further presented on the front side of the card, the basic information including at least one of the following information: contact name, level, dan (also referred to as rank), online state, and intimacy degree.

In the embodiments of this disclosure, the flip presentation module 903 is further configured to determine a triggered target interaction control and present an interaction interface corresponding to the target interaction control in response to a triggering operation on the interaction control on the back side of the card.

In the embodiments of this disclosure, the flip presentation module 903 is further configured to present an interaction interface corresponding to a target interaction control in the contact interface in response to a second operation on the front side of the card, the target interaction control being any one of the at least one interaction control.

In the embodiments of this disclosure, the flip presentation module 903 is further configured to determine the triggered target interaction control based on an operation type of the second operation in response to the second operation on the front side of the card; and present the interaction interface corresponding to the target interaction control in the contact interface.

In the embodiments of this disclosure, the flip presentation module 903 is further configured to present the back side of the contact card and present the interaction interface corresponding to the target interaction control on the back side of the card in response to the second operation on the front side of the card.

In the embodiments of this disclosure, the flip presentation module 903 is further configured to perform flip in a flip direction corresponding to the target interaction control to present the back side of the contact card in response to the second operation on the front side of the card.

One or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory.

Each module can be implemented using one or more processors (or processors and memory). Likewise, a processor (or processors and memory) can be used to implement one or more modules. Moreover, each module can be part of an overall module that includes the functionalities of the module.

It may be understood that, according to the contact information presentation method according to the embodiments of this disclosure, in the contact interface of the target application corresponding to the virtual scene, contact information is presented by a card, and the front side of the card and the back side of the card are respectively used to present the virtual avatar of the contact and the interaction control. Compared with a list form, the foregoing card form enables the information element (virtual avatar) of the contact and the interaction control to be presented in a relatively large size. The information display effect is ensured and the accuracy of control triggering is improved, thereby improving the interaction efficiency based on the contact information.

Figure 10:
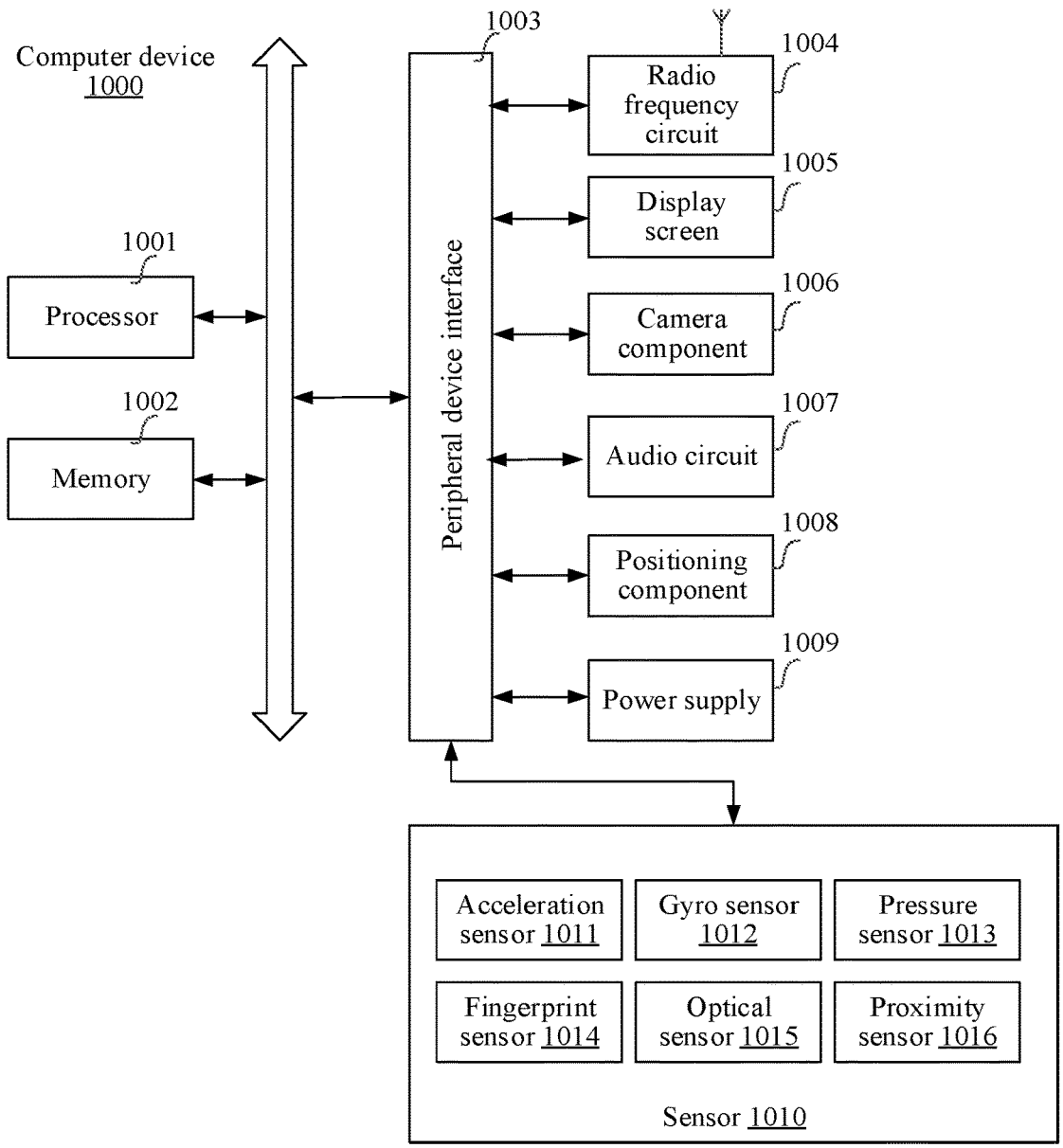
FIG. 10 is a structural block diagram of a computer device according to an embodiment of this disclosure.

FIG. 10 is a structural block diagram of a computer device 1000 according to an exemplary embodiment of this disclosure. The computer device 1000 may be a smartphone, a tablet computer, an MP3 player, an MP4 player, a notebook computer, a desktop computer, or the like.

Generally, the user equipment 1000 includes a processor 1001 and a memory 1002.

Processing circuitry, such as the processor 1001, may include one or more processing cores, and may be, for example, a 4-core processor or an 8-core processor. The processor 1001 may be implemented by using at least one hardware form of digital signal processing (DSP), a field-programmable gate array (FPGA), and a programmable logic array (PLA).

The memory 1002 may include one or more computer-readable storage media that may be non-transitory. The memory 1002 may further include a high-speed random access memory and a non-volatile memory, for example, one or more disk storage devices or flash storage devices. In some embodiments, the non-transitory computer-readable storage medium in the memory 1002 is configured to store at least one computer program/instruction, and the at least one computer program/instruction is configured to be executed by the processor 1001 to implement the method provided in the method embodiments of this disclosure.

In some embodiments, the computer device 1000 may include a peripheral device interface 1003 and at least one peripheral device. The processor 1001, the memory 1002, and the peripheral device interface 1003 may be connected through a bus or a signal cable. Each peripheral device may be connected to the peripheral device interface 1003 through a bus, a signal cable, or a circuit board. In the embodiments of this disclosure, the peripheral device includes at least one of a radio frequency circuit 1004, a display screen 1005, a camera component 1006, an audio circuit 1007, a positioning component 1008, and a power supply 1009.

The peripheral device interface 1003 may be configured to connect at least one I/O-related peripheral device to the processor 1001 and the memory 1002.

The radio frequency circuit 1004 is configured to receive and emit a radio frequency (RF) signal, which is also referred to as an electromagnetic signal. The radio frequency circuit 1004 communicates with a communication network and other communication devices through the electromagnetic signal. The radio frequency circuit 1004 converts an electrical signal into an electromagnetic signal for emission, or converts a received electromagnetic signal into an electrical signal.

The display screen 1005 is configured to display a user interface (UI). The UI may include graphics, text, icons, videos, and any combination thereof. When the display screen 1005 is a touch display screen, the display screen 1005 is further capable of collecting touch signals on or above a surface of the display screen 1005. The touch signal may be inputted, as a control signal, to the processor 1001 for processing. In this case, the display screen 1005 may be further configured to provide a virtual button and/or a virtual keyboard that are/is also referred to as a soft button and/or a soft keyboard.

The camera component 1006 is configured to collect images or videos. In the embodiments of this disclosure, the camera component 1006 includes a front-facing camera and a rear-facing camera.

The audio circuit 1007 may include a microphone and a speaker. The microphone is configured to collect sound waves of users and surroundings, and convert the sound waves into electrical signals and input the signals to the processor 1001 for processing, or input the signals to the radio frequency circuit 1004 to implement voice communication. The speaker may be a traditional thin-film speaker or a piezoelectric ceramic speaker. In some embodiments, the audio circuit 1007 may further include a headphone jack.

The positioning component 1008 is configured to position a current geographical position of the computer device 1000 to implement navigation or location based service (LBS). The positioning component 1008 may be a positioning component based on the global positioning system (GPS), the Beidou system, or the Galileo system.

The power supply 1009 is configured to supply power to components in the computer device 1000. The power supply 1009 may be an alternating-current power supply, a direct-current power supply, a disposable battery, or a rechargeable battery.

In some embodiments, the computer device 1000 further includes one or more sensors 1010. The one or more sensors 1010 include but are not limited to an acceleration sensor 1011, a gyro sensor 1012, a pressure sensor 1013, a fingerprint sensor 1014, an optical sensor 1015, and a proximity sensor 1016.

It is noted that the structure shown in FIG. 10 does not constitute any limitation on the computer device 1000, and the computer device may include more components or fewer components than those shown in the figure, or some components may be combined, or a different component deployment may be used.

It is noted that all or some of the steps of the methods in the embodiments may be implemented by a program instructing relevant hardware. The program may be stored in a computer-readable storage medium. The computer-readable storage medium may be the computer-readable storage medium included in the memory in the embodiments of this disclosure, or may be a computer-readable storage medium that exists independently and that is not assembled in an electronic device. The computer-readable storage medium stores at least one computer program, the at least one computer program being loaded and executed by a processor to implement the contact information presentation method according to the embodiments of this disclosure.

The computer-readable storage medium may include: a read only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this disclosure are merely for description purpose, and do not indicate the preference among the embodiments.

It is noted that that all or part of the steps of implementing the embodiments of this disclosure may be implemented by hardware, or may be implemented by a program instructing related hardware. The program may be stored in a computer-readable storage medium. The computer-readable storage medium provided in the embodiments of this disclosure may be a read only memory, a magnetic disk or an optical disc.

In the embodiments of this disclosure, a computer program product or a computer program is further provided. The computer program product or the computer program includes a computer instruction, the computer instruction being stored in a computer-readable storage medium. A processor of an electronic device reads the computer instruction from the computer-readable storage medium and executes the computer instruction, to cause the electronic device to perform the contact information presentation method according to the embodiments of this disclosure.

It may be understood that, in the embodiments of this disclosure, when the basic information of the contact involved and other relevant data are applied to a specific product or technology, user permission or consent is required, and the collection, use and processing of the relevant data need to comply with the relevant laws, regulations and standards of the relevant country and region.

Other implementation solutions of this disclosure should become apparent after considering the specification and practicing the solution that is disclosed herein. This disclosure is intended to cover any variation, use, or adaptive change of this disclosure. These variations, uses, or adaptive changes follow the general principles of this disclosure. The specification and the embodiments are merely for an illustration purpose.

It should be understood that this disclosure is not limited to the precise structures/solutions described above and shown in the accompanying drawings, and various modifications and changes can be made without departing from the scope of the present disclosure.

What is claimed is:

1. A method for contact information presentation, the method comprising:
   providing a contact interface for an application including a virtual scene;
   presenting a front side of a contact card associated with a contact in the contact interface, the front side comprising a virtual avatar of the contact in the virtual scene;
   detecting a first operation on the front side of the contact card;
   in response to the first operation, presenting, by processing circuitry, a back side of the contact card in the contact interface, the back side comprising at least one interaction control for an interaction with the contact;
   detecting a second operation on the front side of the contact card; and
   in response to the second operation, presenting a first interaction interface associated with a first interaction control in the contact interface, the first interaction control being an interaction control of the at least one interaction control.

2. The method according to claim 1, wherein the method further comprises:
   obtaining, from a server, a virtual appearance parameter associated with the contact;
   generating a virtual model of the contact in the virtual scene based on the virtual appearance parameter; and
   obtaining the virtual avatar based on the virtual model.

3. The method according to claim 2, wherein the obtaining the virtual avatar based on the virtual model comprises at least one of:
   performing a photo shooting on the virtual model to obtain the virtual avatar; and/or
   setting the virtual model as the virtual avatar.

4. The method according to claim 2, wherein the virtual appearance parameter indicates a first virtual decoration of at least one part of the virtual model; and
   the method further comprises:
   obtaining, in response to failure information from the server, a second virtual decoration of the at least one part associated with a first user account, the failure information from the server indicating that the obtaining of the virtual appearance parameter from the server fails, and the first user account being a user account logged in an electronic device;
   determining the first virtual decoration of the at least one part of the virtual model based on the second virtual decoration of the at least one part of the first user account; and
   setting the first virtual decoration of the at least one part of the virtual model as the virtual appearance parameter.

5. The method according to claim 1, wherein the method further comprises:
   obtaining the virtual avatar from a server, the virtual avatar being generated by the server based on a virtual appearance parameter corresponding to the contact.

6. The method according to claim 1, wherein the presenting the back side of the contact card in the contact interface comprises:
   displaying a card flipping animation of the contact card from the front side to the back side in response to the first operation on the front side of the contact card.

7. The method according to claim 1, wherein the front side of the contact card comprises at least one of: a contact name, a level, rank, online state, and intimacy degree.

8. The method according to claim 1, wherein the method further comprises:
   detecting a triggering operation on the first interaction control in the at least one interaction control on the back side of the contact card; and
   presenting the first interaction interface associated with the first interaction control in response to the triggering operation.

9. The method according to claim 1, wherein the presenting the first interaction interface associated with the first interaction control in the contact interface comprises:
   determining the first interaction control from the at least one interaction control based on an operation type of the second operation.

10. The method according to claim 1, wherein the presenting the first interaction interface associated with the first interaction control in the contact interface comprises:
    presenting the back side of the contact card; and
    presenting the first interaction interface associated with the first interaction control on the back side of the contact card in response to the second operation on the front side of the contact card.

11. The method according to claim 10, wherein the presenting the back side of the contact card in response to the second operation on the front side of the contact card comprises:

displaying a card flipping animation of the contact card in a flip direction associated with the first interaction control to present the back side of the contact card in response to the second operation on the front side of the contact card.

12. An apparatus for contact information presentation, comprising processing circuitry configured to:
provide a contact interface for an application including a virtual scene;
present a front side of a contact card associated with a contact in the contact interface, the front side comprising a virtual avatar of the contact in the virtual scene;
detect a first operation on the front side of the contact card;
in response to the first operation, present a back side of the contact card in the contact interface, the back side comprising at least one interaction control for an interaction with the contact;
detect a second operation on the front side of the contact card; and
in response to the second operation, present a first interaction interface associated with a first interaction control in the contact interface, the first interaction control being an interaction control of the at least one interaction control.

13. The apparatus according to claim 12, wherein the processing circuitry is configured to:
obtain, from a server, a virtual appearance parameter associated with the contact;
generate a virtual model of the contact in the virtual scene based on the virtual appearance parameter; and
obtain the virtual avatar based on the virtual model.

14. The apparatus according to claim 13, wherein the processing circuitry is configured to:
perform a photo shooting on the virtual model to obtain the virtual avatar; and/or
set the virtual model as the virtual avatar.

15. The apparatus according to claim 13, wherein the virtual appearance parameter indicates a first virtual decoration of at least one part of the virtual model, and the processing circuitry is configured to:
obtain, in response to failure information from the server, a second virtual decoration of the at least one part associated with a first user account, the failure information from the server indicating that the obtaining of the virtual appearance parameter from the server fails, and the first user account being a user account logged in the apparatus;
determine the first virtual decoration of the at least one part of the virtual model based on the second virtual decoration of the at least one part of the first user account; and
set the first virtual decoration of the at least one part of the virtual model as the virtual appearance parameter.

16. The apparatus according to claim 12, wherein the processing circuitry is configured to:
obtain the virtual avatar from a server, the virtual avatar being generated by the server based on a virtual appearance parameter corresponding to the contact.

17. The apparatus according to claim 12, wherein the processing circuitry is configured to:
display a card flipping animation of the contact card from the front side to the back side in response to the first operation on the front side of the contact card.

18. The apparatus according to claim 12, wherein the front side of the contact card comprises at least one of: a contact name, a level, rank, online state, and intimacy degree.

19. A non-transitory computer-readable storage medium storing instructions which when executed by at least one processor cause the at least one processor to perform:
providing a contact interface for an application including a virtual scene;
presenting a front side of a contact card associated with a contact in the contact interface, the front side comprising a virtual avatar of the contact in the virtual scene;
detecting a first operation on the front side of the contact card;
in response to the first operation, presenting a back side of the contact card in the contact interface, the back side comprising at least one interaction control for an interaction with the contact;
detecting a second operation on the front side of the contact card; and
in response to the second operation, presenting a first interaction interface associated with a first interaction control in the contact interface, the first interaction control being an interaction control of the at least one interaction control.

* * * * *

UNITED STATES PATENT AND TRADEMARK OFFICE
CERTIFICATE OF CORRECTION

| | |
|---|---|
| PATENT NO. | : 12,282,990 B2 |
| APPLICATION NO. | : 17/986841 |
| DATED | : April 22, 2025 |
| INVENTOR(S) | : Yue Liu |

Page 1 of 1

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Twentieth Day of May, 2025

Coke Morgan Stewart
*Acting Director of the United States Patent and Trademark Office*